Jan. 24, 1933.  J. F. ANCONA  1,895,304
FISHING REEL
Filed Oct. 14, 1929  3 Sheets-Sheet 2
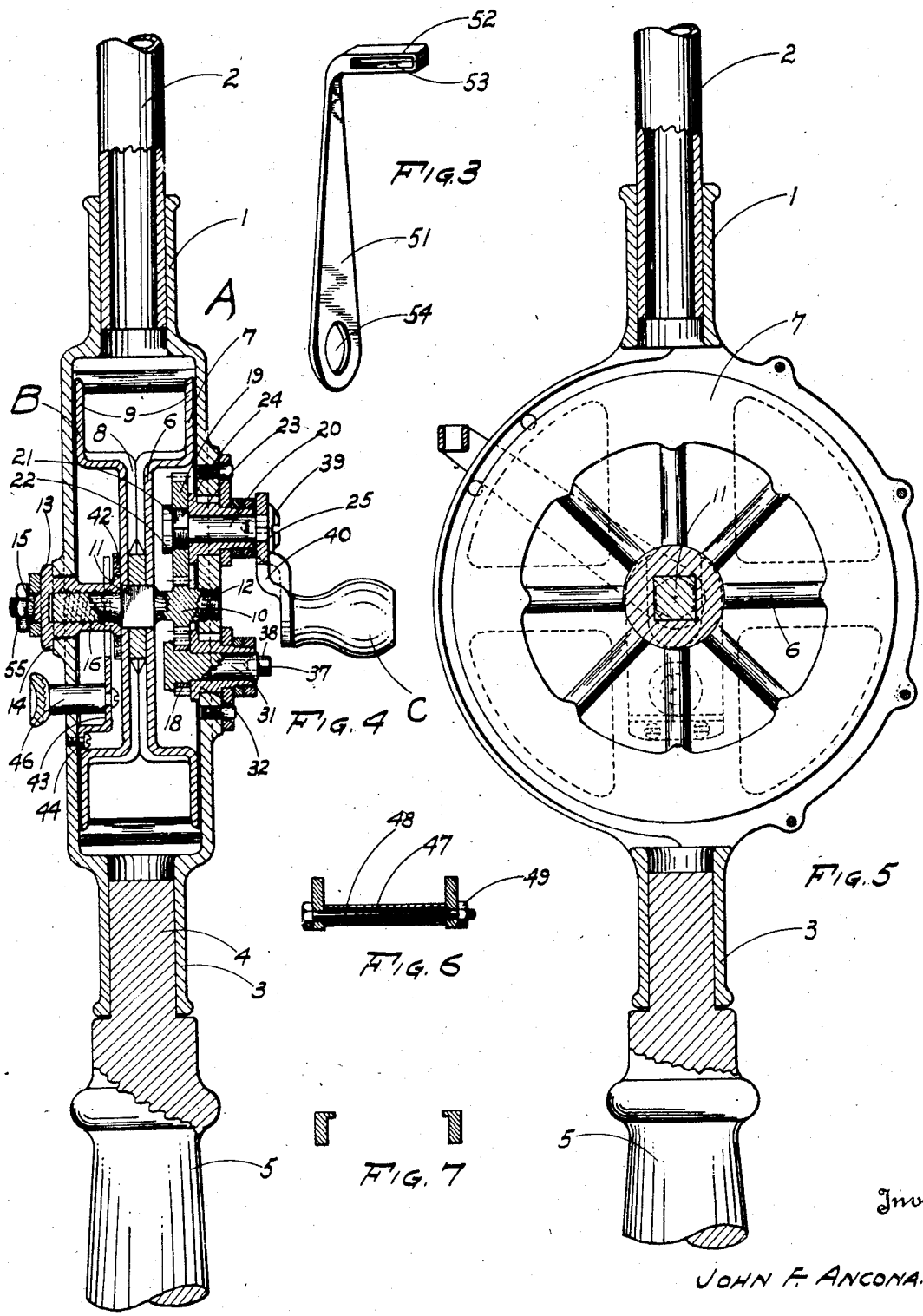
Inventor
JOHN F. ANCONA.
By John A. Robertson
Attorney Jan. 24, 1933.   J. F. ANCONA   1,895,304
FISHING REEL
Filed Oct. 14, 1929   3 Sheets-Sheet 3

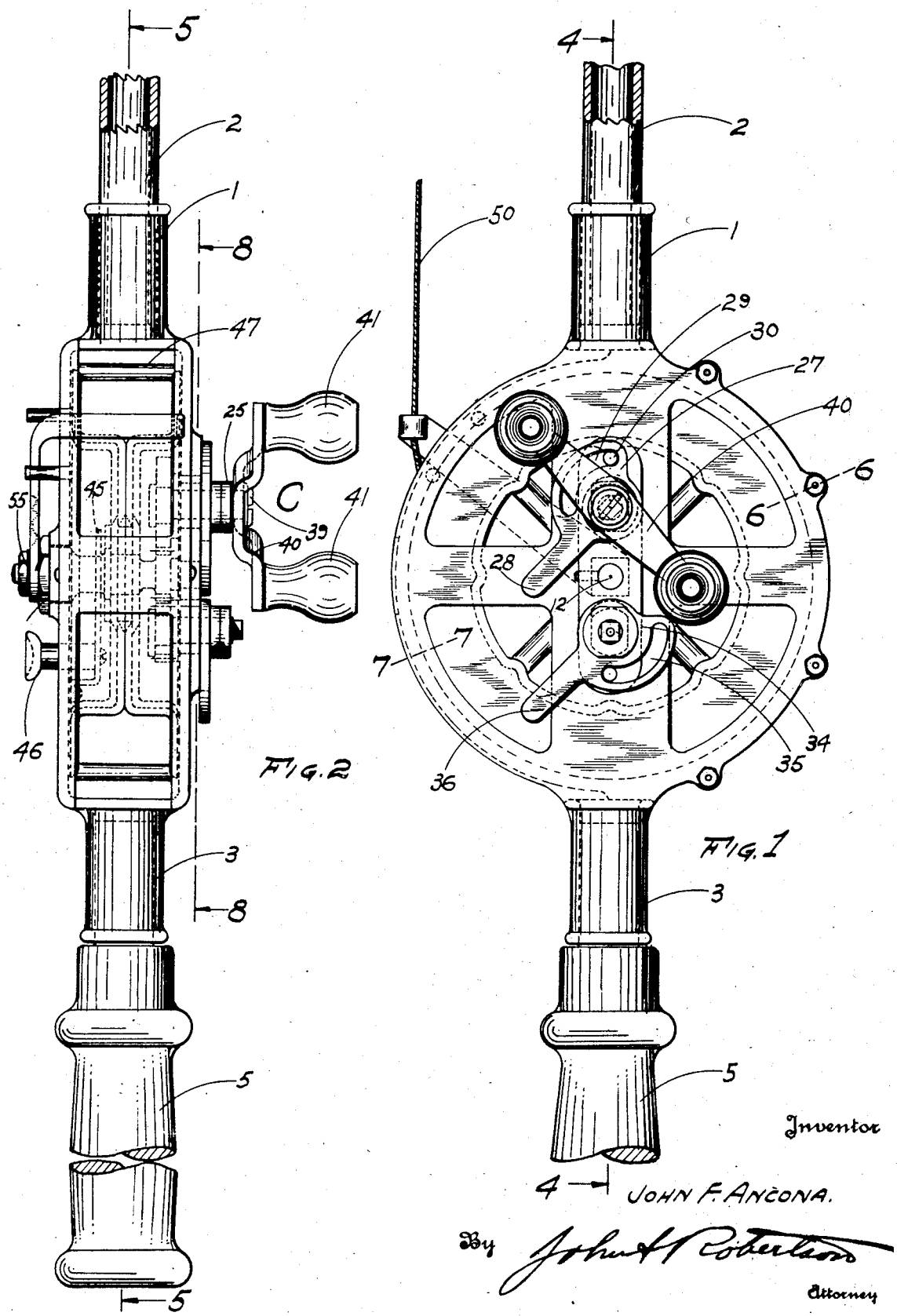

Inventor
JOHN F. ANCONA.
By John F. Robertson
Attorney

Patented Jan. 24, 1933

1,895,304

UNITED STATES PATENT OFFICE

JOHN F. ANCONA, OF READING, PENNSYLVANIA

FISHING REEL

Application filed October 14, 1929. Serial No. 399,588.

This invention has to do with the art of fishing apparatus and is particularly concerned with the provision of certain novel reel and housing constructions which are intended to obviate some of the difficulties now experienced by fishermen and generally provide for improved results.

The instant invention is a result of the recognition on my part of certain undesirable phases of fishing which I propose to change for the better by this development. Perhaps one of the more important objects of the invention is to provide a housing and reel unit which is adapted to be detachably mounted on a fishing rod having a properly sized stock and which unit contains all the operating mechanism for performing reeling operations. I contemplate the use of reel driving mechanism for operating the reel under different speeds which of course means with changes in the power on the line due to the principles of mechanical advantage.

In the present instance this last-noted thought has taken embodiment in a two speed drive for the reel. Several detailed objects and advantages are associated with the provision of a practically operable mechanism for attaining the ends noted. These will in part become apparent and in part be hereinafter stated as the description of the invention proceeds.

Another feature of the invention of paramount importance is the novel construction of housing for the reel mechanism provided hereby. This invention has in view the provision of a distinctly novel type of housing structure as will be hereinafter more fully developed.

A further more detailed feature of the instant improvement is the provision of new and improved means for guiding the line onto the reel during winding operations. It is my idea to avail of a new type of device for this purpose to inhibit to as great an extent as feasible tangling and uneven winding with their accompanying inconvenience.

I also wish to emphasize the novelty of the reel construction per se and its mounting in the housing. With this phase of the construction is associated another important part of the invention, to wit, the novel braking means which I propose to incorporate into the reel and housing construction in order to provide improved results as compared with present day brakes of this type.

With these and other more detailed objects and advantages in view, the invention comprises certain novel constructions, combinations, and arrangements of parts as will be subsequently specified and claimed.

For a full and more complete understanding of the invention, reference may be had to the following description and accompanying drawings, wherein Figure 1 is a side view of a housing and reel unit made in accordance with this invention, certain parts being indicated by dotted lines.

Figure 2 is a view of the construction shown in Figure 1 but looking in a direction at right angles to the direction of Figure 1.

Figure 3 is a detailed perspective showing of the lead in arm for the line.

Figure 4 is a center section taken about on the line 4—4 of Figure 1.

Figure 5 is a center sectional view at right angles to that of Figure 4. This view is taken about on the line 5—5 of Figure 2.

Figure 6 is a fragmentary illustration in section of a part of the housing construction. This view is taken on the line 6—6 of Figure 1.

Figure 7 is a view similar to Figure 6 but taken on the line 7—7 of Figure 1.

Figure 8:
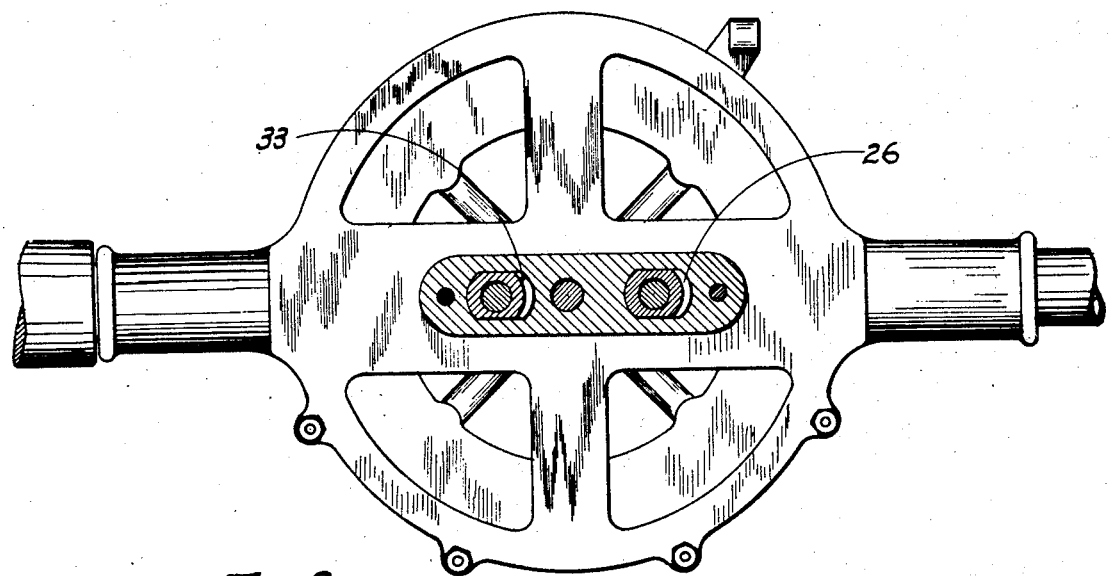
Figure 8 is a sectional showing taken on the line 8—8 of Figure 2.
Figure 9:
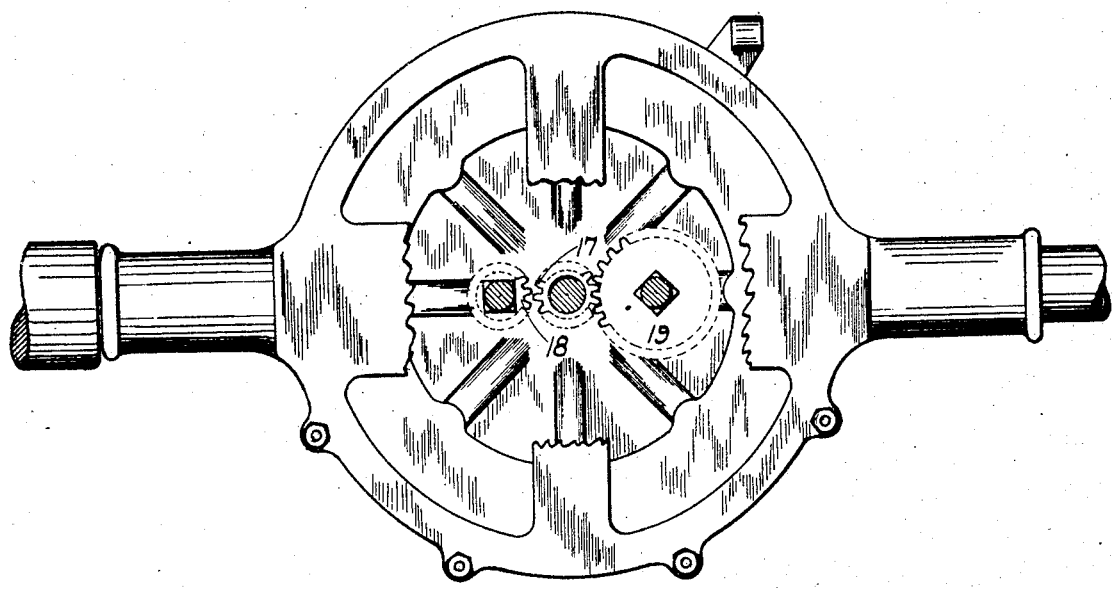
Figure 9 is a side view, somewhat diagrammatic, with parts broken away, of the housing and reel unit.

While a preferred specific embodiment of the invention is herein set forth, it is to be understood that I am not to be limited to the exact constructions illustrated and described, because various modifications of these details may be provided in putting the invention into practice within the purview of the appended claims.

Throughout the following description and the various figures of the drawings, like reference characters denote corresponding parts.

Referring now to the drawings, a housing such as I propose to provide is shown and designated generally A. This housing A is formed at one end with a socket portion 1 which receives one end of a fishing rod 2. The latter may be of any conventional construction and design and if desired may be made integral with the housing A. Diametrically oppositely disposed with respect to the socket 1 is another socket 3 which receives the shank portion 4 of a handle member 5. As in the case of the rod 2, the handle 4 is susceptible of being formed in any desired size and shape. It is my idea to have the connection between the handle and housing of a detachable nature so that a variety in the handles employed with any housing may adapt the equipment to different types of fishing.

Operatively disposed within the housing A is a reel member referred to as B. While this reel member may be of almost any form, I prefer to employ the illustrated construction wherein the reel B comprises the complementary members 6 and 7 which may be stamped from sheet metal to provide reinforcing ribs or corrugations 8 and the peripheral flanges 9 which define the line receiving portion of the reel.

The reel B is non-rotatably mounted on a shaft 10 through the medium of the non-circular portion 11. At one end the shaft 10 has bearing in a thickened portion of the housing A as shown at 12, while the other end is journaled in a bushing 13. The latter is threaded into the housing A as shown at 14 and is formed with a projection 15 for a purpose to be later set out. The inner cylindrical surface of the bushing 13 is provided with spirally arranged grooves 16 which facilitate lubrication of the shaft 10.

This shaft 10 is provided with a spur gear 17 which may be integral therewith as shown in the illustrated form. Adapted to be brought into mesh with the gear 17 are pinions 18 and 19 of different diameters. When the pinion 19 is operatively associated with the gear 17, the reel B is adapted for high speed work and when the pinion 18 engages gear 17 the reel operates at low speed.

The pinion 19 is non-rotatably mounted on a shaft 20 at the squared portion 21 and held thereon by a shoulder 22. The shaft 20 is carried by a bushing 23 having a flange 24 which is disposed between the pinion 19 and the housing A. This flange, together with lock nuts 25, serves to hold the gear 19, together with its associated mechanism, in proper position. The bushing 23 is movable in the slot under the influence of cam means, to be hereinafter more fully described, to move the pinion 19 into and out of engagement with spur gear 17. A quadrant-shaped plate 27, having operating finger 28, is rotatably carried by the bushing 23 and is held against the face of the housing A by the lock nuts 25. This member 27 is provided with an arcuate slot 29 which is eccentric with respect to the axis of the bushing 23. A pin 30 is mounted on the housing and enters the slot 29 in such a manner as to engage both sides of the slot. This pin 30 is threaded into the housing as clearly shown in Figure 4. Due to the eccentricity of the slot 29, a rotation of the quadrant 27 causes a sliding movement of the bushing 23 in the opening 26 to move the pinion 19 into or out of engagement with spur gear 17 as desired.

The pinion 18 has associated therewith mechanism which is substantially a duplicate of that described in the preceding paragraph as associated with the pinion 19. This mechanism may be briefly described as comprising a shaft 31 carried by bushing 32 and which is movable in the opening 33 by a second quadrant member 34 having an arcuate slot 35 and an operating finger 36.

Each of the shafts 20 and 31 is formed with a non-circular projection 37 which is provided with a threaded bore 38 to receive a retaining bolt 39. The cross bar portion 40 of the reel operating member is provided with an opening which is complementary to the contour of the projection 37 so that when the cross bar 40 is fitted over the projection 37 and held in place thereon by the bolt 39, the operating member referred to generally as C will be properly held in position. This member C is preferably of the form shown in Figure 2, wherein knobs 41 are mounted at each end of the cross bar 40 but offset somewhat from the plane thereof so as not to interfere with the working of the cam devices 27 and 34.

When the operating member C is mounted on the shaft 20, the quadrants 27 and 34 will be properly adjusted so that the pinion 19 will be in mesh with the spur gear 17, while the pinion 18 is disengaged therefrom. It is notable that the fingers 28 and 36 on the members 27 and 34 are so arranged that only one of the pinions 18 and 19 may be engaged with the gear 17 at any one time. Of course when a low speed drive is desired, the operating member C will be mounted on the shaft 31 and the pinion 18 brought into engagement with the spur gear 17 rather than the pinion 19.

Novel braking mechanism for the reel B is shown as comprising a ring 42 of some suitable friction material which is carried by the part 9 of the reel B and this ring 42 is disposed around the bushing 13 at its inner end. A spring arm 43 is fastened to the inner wall of the housing A by an offset portion as shown at 44 in Figure 4, and this spring arm 43 has a portion 45 which is adapted to engage the friction ring 42 when it is urged inwardly. To accomplish this last-mentioned action, a finger operated member 46 projects through the housing A and is fastened to the spring arm 43. Upon pressing member 46 inwardly, the portion 45 of the arm 43 engages the ring 42 to provide the desired braking effects.

A portion of the housing A is of an open construction as shown in Figures 5, 6 and 7. This construction includes sleeves 47 which house bolts 48 that pass through both sides of the housing A to properly position the sides of the housing through cooperation with the sleeve 47, the heads of the bolts 48 and nuts 49.

Line 50 enters the housing A and is taken up on the reel B. My improved mechanism for controlling the winding of the line on the reel to provide for an even distribution of the line thereon is shown as comprising a radial arm 51 having an overturned outer portion 52 which extends in a direction parallel with the axis of the reel and which is formed with a slot 53. This member 51 is clearly shown in Figure 3 and it is provided with a hub opening 54 which is designed to receive the projection 15 on the bushing 13. A nut 55 retains the member 51 in position on the projection 15. The line 50 passes through the slot 53 and is thereby permitted to travel across the reel as it is being wound thereon.

Having thus described my invention, what I claim as new and desire to secure by Letters Patent of the United States is:

1. Fishing reel apparatus of the class described, comprising, in combination, a housing, means for attaching a fishing rod to the housing, means for attaching a handle to the housing at a point remote from the connection with the rod, a reel located within the housing for operation therein, a shaft mounted axially with respect to the reel and having bearing in the housing, a spur gear on said shaft, the housing being formed with a pair of elongated openings, a shaft in each of said openings and movable therein, pinions carried by each of said shafts, said pinions being of different diametric dimensions, means for moving the shafts in said openings to engage or disengage the pinions from the gear, and means at the end of each shaft for detachably mounting an operating member thereon.

2. Fishing reel apparatus of the class described, comprising, in combination, a housing, means for attaching a fishing rod to the housing, means for attaching a handle to the housing at a point remote from the connection with the rod, a reel located within the housing for operation therein, a shaft mounted axially with respect to the reel and having bearing in the housing, a spur gear on said shaft, the housing being formed with a pair of elongated openings, a shaft in each of said openings and movable therein, pinions carried by each of said shafts, said pinions being of different diametric dimensions, bushings movable in said openings and receiving the shafts, cam devices for moving the bushings in the openings, said cam devices having fingers so arranged that the bushings may be positioned so as to permit of engagement with only one of the pinions with the gear at one time, and means for detachably mounting an operating member on either of the said shafts.

In testimony whereof I hereunto affix my signature this thirtieth day of September, 1929.

JOHN F. ANCONA.